United States Patent [19]
Bradford

[11] Patent Number: 5,951,862
[45] Date of Patent: Sep. 14, 1999

[54] FILTER

[75] Inventor: Peter Francis Bradford, Kent, United Kingdom

[73] Assignee: Lucas Industries plc, United Kingdom

[21] Appl. No.: 09/014,222

[22] Filed: Jan. 27, 1998

[30] Foreign Application Priority Data

Feb. 12, 1997 [GB] United Kingdom .................... 9702845

[51] Int. Cl.[6] .................................................. B01D 35/01
[52] U.S. Cl. .......................... 210/305; 210/308; 210/436; 210/438; 210/440; 210/444; 210/458; 210/472; 210/493.1
[58] Field of Search ..................................... 210/305, 307, 210/308, 309, 436, 438, 440, 444, 458, 472, 493.1

[56] References Cited

U.S. PATENT DOCUMENTS 3,502,218  3/1970  Tuffnell et al. .......................... 210/305

FOREIGN PATENT DOCUMENTS

| 579 484 | 1/1994 | European Pat. Off. . |
| 655 269 | 5/1995 | European Pat. Off. . |
| 732 133 | 9/1996 | European Pat. Off. . |
| 93 15 839 | 2/1995 | Germany . |
| 94 08 687 | 9/1995 | Germany . |
| WO 94 15695 | 7/1994 | WIPO . |

Primary Examiner—Matthew O. Savage
Attorney, Agent, or Firm—Andrus, Sceales, Starke & Sawall

[57] ABSTRACT

A filter comprises a filter cartridge located within a housing. Fuel flows through a filter medium of the cartridge, in use, from an outer chamber to an inner chamber. From the inner chamber, the fuel flows over and around a sedimentation baffle located within a sedimentation chamber. Fuel exits the sedimentation chamber through an outlet passage, an air collection chamber being arranged to collect air from the flow of fuel. Air exits the air collection chamber via openings.

5 Claims, 1 Drawing Sheet

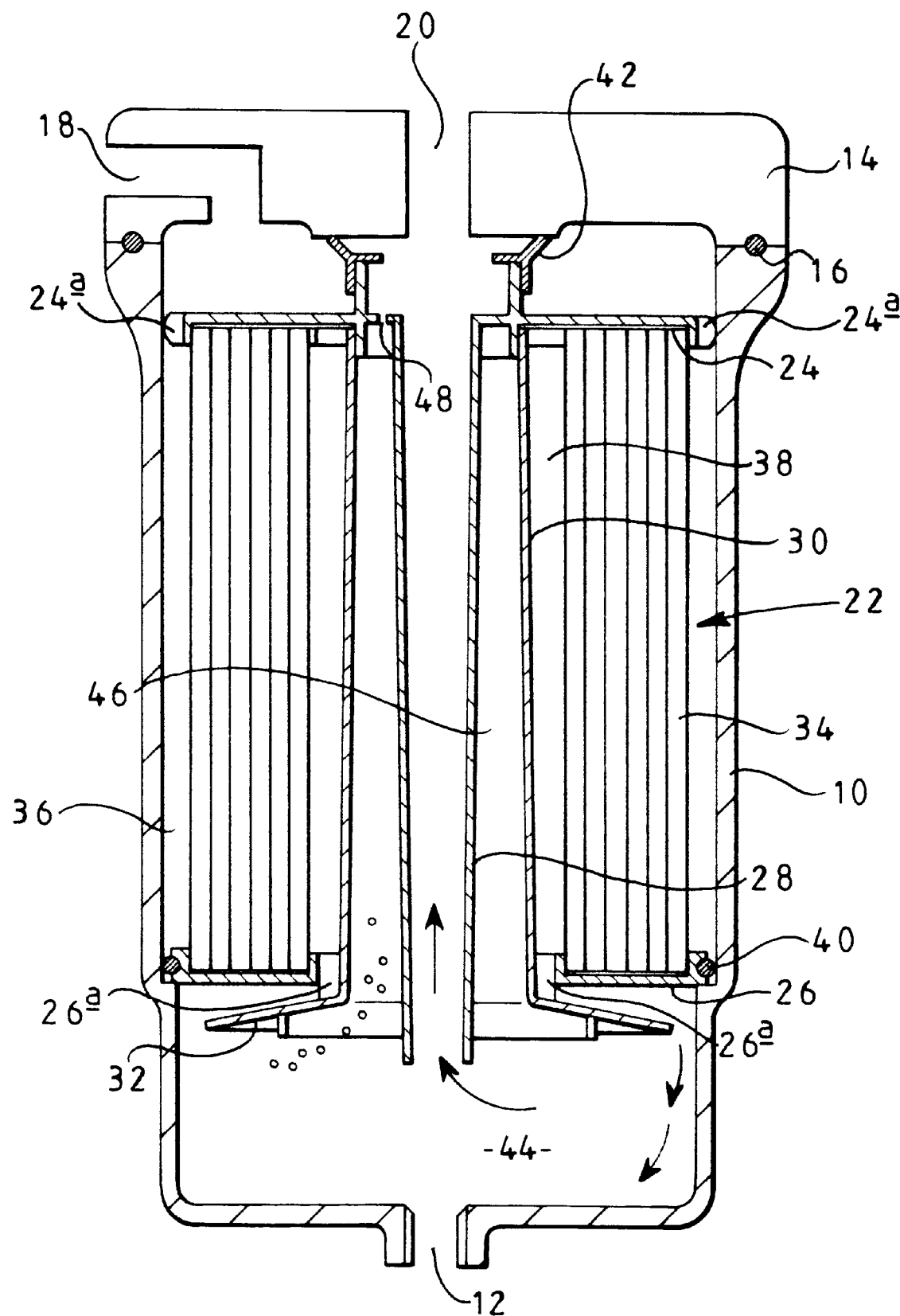

FILTER

This invention relates to a filter for use in filtering the fuel supplied to a high pressure fuel pump arranged to supply fuel at high pressure to the cylinders of an associated internal combustion engine, in turn. In particular, this invention relates to a filter in which fuel flows through a filter medium in a substantially radial direction, the fuel flowing from an outer annular chamber through the filter member to an inner chamber.

It is an object of the invention to provide a filter of the type described hereinbefore which permits the separation of water and air from the flow of fuel through the filter.

According to the present invention there is provided a filter comprising a filter cartridge located within a housing, the housing having an inlet and an outlet, the filter cartridge and housing defining an outer annular chamber communicating with the inlet, the filter cartridge defining an inner annular chamber which communicates with the outer annular chamber through a filter medium, the filter cartridge and housing defining a sedimentation chamber which communicates with the inner annular chamber, the filter cartridge carrying a sedimentation baffle which is located within the sedimentation chamber, the sedimentation chamber communicating with an outlet passage extending through the filter cartridge, the outlet passage communicating with the outlet, the sedimentation chamber further communicating with an air collection chamber, wherein the air collection chamber communicates through at least one small opening with the outlet.

The outlet passage conveniently extends along the axis of the filter cartridge, the air collection chamber comprising an annular chamber surrounding the outlet passage and radially inward of the inner annular chamber, the outlet passage extending downwards beyond the entrance to the air collection chamber.

The invention further relates to a filter cartridge suitable for use in a filter of the type defined hereinbefore.

The invention will be described, by way of example with reference to the accompanying drawing which is a sectional view of a filter in accordance with an embodiment.

The filter illustrated in the accompanying drawing comprises a generally cylindrical filter housing or bowl 10 having a screw-threaded opening 12 in its lower end surface to which an appropriate tap or plug may be secured. A filter head 14 is secured to the upper end of the bowl 10, and an O-ring 16 is located therebetween to provide a fluid tight seal between the filter head 14 and bowl 10. The filter head 14 is provided with an opening defining a fuel inlet 18 and an axial opening defining a fuel outlet 20.

A filter cartridge 22 is located within the bowl 10, the filter cartridge 22 comprising an upper annular support plate 24 and a lower annular support plate 26. The upper annular support plate 24 includes a downwardly depending axially extending tube 28 which extends below the level of the lower support plate 26. The upper support plate 24 also carries a downwardly depending tubular member 30 which surrounds the tube 28, the lower end 32 of the tubular member 30 being angled outwardly beneath the lower support plate 26 to define a conical sedimentation baffle 32 of large cone angle. The lower annular support plate 26 is secured to the tubular member 30 above the sedimentation baffle 32, the lower annular support plate 26 being shaped so as to define a series of openings 26a permitting communication between the upper surface of the lower support plate 26 and the upper surface of the sedimentation baffle 32.

Between the upper and lower support plates 24, 26, a pleated paper filter member 34 is located, the filter member 34 being of star-like configuration in cross-section. The upper and lower support plates 24, 26 each include lips which locate the outer periphery of the filter member 34 to define an annular chamber 36 between the outer periphery of the filter member 34 and the inner surface of the bowl 10. The upper and lower support plates 24, 26 are also provided with shapings which ensure that the inner periphery of the pleated filter member 34 is spaced from the tubular member 30 to define an inner annular chamber 38 which communicates through the pleated paper filter member 34 with the outer annular chamber 36.

The lower annular support plate 26 carries at its outer periphery an O-ring 40 which is arranged to engage the inner surface of the filter bowl 10, the lower support plate 26 being supported by a step provided in the bowl 10 to locate the filter cartridge 22 correctly within the bowl 10. The upper support plate 24 is shaped at its outer periphery to define fluid flow channels 24a permitting communication between the inlet 18 and the outer annular chamber 36. The upper support plate 24 further carries an annular seal 42 to provide a fuel-tight seal between the upper support plate 24 and the filter head 14, the seal 42 being located to permit communication between the interior of the axially extending tube 28 and the outlet 20.

With the filter cartridge 22 located as illustrated within the bowl 10, and with the filter head 14 sealed thereto, the assembled filter is connected within a fuel supply system such that the inlet 18 communicates with a fuel reservoir and the outlet 20 communicates with a low pressure pump which, in turn is arranged to supply fuel to a high pressure fuel pump. In use, fuel is drawn through the inlet 18 by the low pressure pump, the fuel flowing from the inlet 18 through the flow channels 24a to the outer annular chamber 36. The fuel is able to flow through the pleated paper filter member 34 to the inner annular chamber 38 from where the fuel flows downwardly through the openings 26a towards a sedimentation chamber 44 defined between the filter bowl 10 and the lower support plate 26. The sedimentation baffle 32 ensures that the fuel flows at a relatively low velocity along a flow path of relatively great length. The low velocity of the fuel and the length of the flow path promote sedimentation resulting in contaminants of relatively high density, for example water, separating from the flow of fuel and collecting in the bottom of the sedimentation chamber 44. Similarly, contaminants of relatively low density, for example air, collect beneath the sedimentation baffle 32 and flow upwardly between the tubular member 30 and axially extending tube 28, the interior of the tubular member 30 and exterior of the axially extending tube 28 defining an air collection chamber 46. Fuel exits from the sedimentation chamber 44 through the axially extending tube 28 from where it can flow through the outlet 20 to the low pressure pump and subsequently to the high pressure pump.

The upper end of the air collection chamber 46 communicates with the outlet 20 through a small opening 48, and air which collects within the air collection chamber 46 is able to escape at a controlled rate through the opening 48 in the form of a stream of small air bubbles. It has been found that permitting the air to continue with the flow of fuel in the form of a series of small air bubbles is not detrimental to the operation of the high pressure fuel pump whereas if air were permitted to continue in the form of large air bubbles, operation of the high pressure fuel pump would be impaired.

It will be appreciated that by extending the axially extending tube 28 below the level of the sedimentation baffle 32 as in the illustrated embodiment, air carried with the flow of fuel tends to enter the air collection chamber 46 rather than passing through the axially extending tube 28 thus the risk of relatively large air bubbles continuing with the flow of fuel to the high pressure pump is reduced.

Periodically, the tap or plug located in the opening 12 is used to drain water and other dense contaminants from the sedimentation chamber 44. At appropriate intervals, the filter cartridge 22 is replaced with a fresh filter cartridge, and it will be appreciated that such replacement also involves removal and replacement of the sedimentation baffle 32 as this forms part of the filter cartridge 22.

It is thought that by arranging the fuel to flow through the filter member in a radially inward direction, clogging of the filter medium due to the effect of waxing is reduced as the spacing of the folds of the filter medium is greater adjacent the outer periphery of the cartridge than it is adjacent the inner chamber of the filter cartridge. It is further thought that arranging for sedimentation to occur after filtration of the fuel has occurred is advantageous in that the flow of the fuel and any fine water droplets carried thereby through the filter medium causes the fine water droplets to agglomerate forming relatively large droplets which are removed effectively by the subsequent sedimentation stage of the filter.

I claim:

1. A filter comprising a filter cartridge located within a housing, the housing having an inlet and an outlet, the filter cartridge and housing defining an outer annular chamber communicating with the inlet, the filter cartridge having an inner annular chamber which communicates with the outer annular chamber through an annular filter medium, wherein the inner and outer annular chambers and filter medium coaxially surround a central axis, the filter cartridge and housing defining a sedimentation chamber adjacent a lower end of the housing which communicates with the inner annular chamber, the filter cartridge carrying a sedimentation baffle which is located within the sedimentation chamber, the sedimentation chamber communicating with an outlet passage extending through the filter cartridge, the outlet passage communicating with the outlet, the sedimentation chamber further communicating with the outlet, the sedimentation chamber further communicating with an air collection chamber, wherein the air collection chamber communicates through at least one opening with the outlet, wherein the outlet passage is defined by a first tubular member which coaxially surrounds said central axis and extends into said sedimentation chamber and below said sedimentation baffle, the air collection chamber comprising an annular chamber defined between the first tubular member and a second tubular member, wherein the second tubular member coaxially surrounds the first tubular member, an annular support plate for sealingly connecting the upper end of the first tubular member to the upper end of the second tubular member, wherein the annular support plate defines said at least one opening, wherein the second tubular member and sedimentation baffle are connected to define an entrance to said air collection chamber, the second tubular member being spaced radially inward from a radially inner surface of said annular filter medium to form the inner annular chamber, the first tubular member extending downwards beyond said entrance to said air collection chamber.

2. A filter as claimed in claim 1, wherein the first tubular member extends downwards beyond a lowermost part of the baffle.

3. A filter as claimed in claim 1, wherein the baffle has a radially outer edge which lies adjacent the housing.

4. A filter as claimed in claim 1, wherein the filter medium comprises a pleated paper filter element, whereby fuel can flow in a generally radial, inward, direction from the outer annular chamber through the filter medium to the inner annular chamber.

5. A filter cartridge for use in a filter including a housing, the filter cartridge defining an inner annular chamber which communicates, in use, with an outer annular chamber defined between the filter cartridge and housing, an annular filter medium located between the inner and outer annular chambers, wherein the inner annular chamber and the annular filter medium coaxially surround a central axis, a sedimentation baffle connected to a lower end of the filter cartridge and located, in use, within a sedimentation chamber defined between the housing and the filter cartridge, the inner annular chamber communicating with the sedimentation chamber, an outlet passage and an air collection chamber, both communicating, in use, with the sedimentation chamber, and at least one opening whereby air can escape at a controlled rate from the air collection chamber, wherein the outlet passage is defined by a first tubular member which coaxially surrounds said central axis and, the air collection chamber comprising an annular chamber defined between the first tubular member and a second tubular member, wherein the second tubular member coaxially surrounds the first tubular member, an annular support plate for sealingly connecting the upper end of the first tubular member to the upper end of the second tubular member, wherein the annular support plate defines said at least one opening, wherein the second tubular member and sedimentation baffle are connected to define an entrance to said air collection chamber, the second tubular member being spaced radially inward from a radially inner surface of said annular filter medium to form the inner annular chamber, the first tubular member extending downwards beyond said entrance to said air collection chamber.

* * * * *